(12) United States Patent
Turner et al.

(10) Patent No.: US 8,694,585 B2
(45) Date of Patent: Apr. 8, 2014

(54) CROSS-INTERFACE COMMUNICATION

(75) Inventors: Erin E. Turner, San Francisco, CA (US); Peter Chi-Hao Huang, Menlo Park, CA (US)

(73) Assignee: Trion Worlds, Inc., Redwood City, CA (US)

( * ) Notice: Subject to any disclaimer, the term of this patent is extended or adjusted under 35 U.S.C. 154(b) by 253 days.

(21) Appl. No.: 12/399,902

(22) Filed: Mar. 6, 2009

(65) Prior Publication Data

US 2010/0229107 A1 Sep. 9, 2010

(51) Int. Cl.
*G06F 15/16* (2006.01)

(52) U.S. Cl.
USPC .......................................... 709/204; 715/757

(58) Field of Classification Search
USPC .......................................... 709/204; 715/757
See application file for complete search history.

(56) References Cited

U.S. PATENT DOCUMENTS

| | | | |
|---|---|---|---|
| 5,819,034 A | 10/1998 | Joseph et al. |
| 5,851,149 A | 12/1998 | Xidos et al. |
| 5,915,090 A | 6/1999 | Joseph et al. |
| 5,987,466 A | 11/1999 | Greer et al. |
| 6,015,348 A | 1/2000 | Lambright et al. |
| 6,052,455 A | 4/2000 | James |
| 6,175,842 B1 | 1/2001 | Kirk et al. |
| 6,253,367 B1 | 6/2001 | Tran et al. |
| 6,751,212 B1 | 6/2004 | Kaji et al. |
| 6,757,696 B2 | 6/2004 | Multer et al. |
| 6,816,787 B2 | 11/2004 | Ramamoorthy et al. |
| 6,883,168 B1 | 4/2005 | James et al. |
| 6,892,230 B1 | 5/2005 | Gu et al. |
| 7,168,035 B1 | 1/2007 | Bell et al. |
| 7,373,377 B2 | 5/2008 | Altieri |
| 7,471,947 B1 | 12/2008 | Papineau |
| 7,502,843 B2 | 3/2009 | Kirstein et al. |
| 7,818,077 B2 | 10/2010 | Bailey |
| 8,026,918 B1 | 9/2011 | Murphy |
| 2003/0058238 A1 | 3/2003 | Doak et al. |
| 2003/0108022 A1 | 6/2003 | Yamamoto |
| 2003/0167305 A1 | 9/2003 | Zhu et al. |
| 2003/0177187 A1 | 9/2003 | Levine et al. |

(Continued)

FOREIGN PATENT DOCUMENTS

| | | |
|---|---|---|
| EP | 0680182 | 11/1995 |
| RU | 2236702 | 9/2004 |
| WO | 2008109132 | 9/2008 |

OTHER PUBLICATIONS

International Search Report and Written Opinion for PCT/US2008/003055, Aug. 11, 2008.

(Continued)

*Primary Examiner* — Thomas Dailey
(74) *Attorney, Agent, or Firm* — Van Pelt, Yi & James LLP

(57) ABSTRACT

Cross-interface communication is described, including generating data associated with a synthetic environment, the synthetic environment comprising one or more communication protocols, converting the data using one of the one or more communication protocols to generate converted data, wherein the converted data is interpreted using another of the one or more communication protocols, and transmitting the data over a communication path between two or more endpoints using one or more communication interfaces, wherein the data, after being interpreted by the another of the one or more communication protocols, is used to present information associated with the synthetic environment on at least one of the two or more endpoints.

22 Claims, 13 Drawing Sheets

(56) References Cited

U.S. PATENT DOCUMENTS

| | | |
|---|---|---|
| 2004/0076178 A1 | 4/2004 | Botton |
| 2004/0103141 A1 | 5/2004 | Miller et al. |
| 2004/0193441 A1 | 9/2004 | Altieri |
| 2005/0068167 A1 | 3/2005 | Boyer et al. |
| 2005/0193120 A1 | 9/2005 | Taylor |
| 2005/0209002 A1 | 9/2005 | Blythe et al. |
| 2005/0272492 A1 | 12/2005 | Stelly |
| 2006/0014585 A1 | 1/2006 | Neogi |
| 2006/0135259 A1 | 6/2006 | Nancke-Krogh et al. |
| 2006/0146848 A1 | 7/2006 | Kirstein et al. |
| 2006/0274784 A1* | 12/2006 | Hsueh et al. ............... 370/466 |
| 2006/0287096 A1 | 12/2006 | O'Kelley et al. |
| 2007/0117630 A1 | 5/2007 | Fowler et al. |
| 2007/0130150 A1 | 6/2007 | Fowler et al. |
| 2007/0173327 A1 | 7/2007 | Kilgore et al. |
| 2007/0191103 A1 | 8/2007 | Van Luchene |
| 2007/0218987 A1 | 9/2007 | Van Luchene et al. |
| 2007/0265091 A1 | 11/2007 | Aguilar et al. |
| 2008/0009345 A1 | 1/2008 | Bailey et al. |
| 2008/0026845 A1* | 1/2008 | Aguilar et al. ............... 463/42 |
| 2008/0026847 A1 | 1/2008 | Mueller et al. |
| 2008/0090659 A1 | 4/2008 | Aguilar et al. |
| 2008/0176655 A1 | 7/2008 | James et al. |
| 2008/0207327 A1 | 8/2008 | Van Luchene et al. |
| 2008/0220873 A1 | 9/2008 | Lee et al. |
| 2008/0294417 A1 | 11/2008 | Brunstetter et al. |
| 2008/0294782 A1 | 11/2008 | Patterson et al. |
| 2009/0006566 A1 | 1/2009 | Veeramachaneni et al. |
| 2009/0017916 A1 | 1/2009 | Blanchard et al. |
| 2009/0055369 A1 | 2/2009 | Phillips et al. |
| 2009/0089439 A1* | 4/2009 | Benco et al. ............... 709/228 |
| 2009/0111576 A1 | 4/2009 | Ostergren et al. |
| 2009/0125481 A1 | 5/2009 | Mendes da Costa et al. |
| 2009/0131177 A1 | 5/2009 | Pearce |
| 2009/0176557 A1 | 7/2009 | Hall et al. |
| 2009/0199275 A1* | 8/2009 | Brock et al. ............... 726/4 |
| 2009/0209335 A1 | 8/2009 | Pearce |
| 2009/0215433 A1 | 8/2009 | Cavanaugh et al. |
| 2009/0231112 A1 | 9/2009 | Baalbergen et al. |
| 2009/0235176 A1 | 9/2009 | Jayanthi |
| 2009/0239556 A1* | 9/2009 | Sennett et al. ............... 455/466 |
| 2009/0253494 A1 | 10/2009 | Fitch et al. |
| 2009/0287640 A1 | 11/2009 | Hamilton et al. |
| 2009/0300525 A1 | 12/2009 | Jolliff et al. |
| 2009/0319668 A1* | 12/2009 | Hamilton et al. ............... 709/227 |
| 2009/0325712 A1 | 12/2009 | Rance |
| 2010/0009703 A1 | 1/2010 | Sornay |
| 2010/0041481 A1* | 2/2010 | Smedley et al. ............... 463/42 |
| 2010/0203936 A1 | 8/2010 | Levy et al. |
| 2010/0251330 A1 | 9/2010 | Kroeselberg et al. |
| 2010/0255916 A1 | 10/2010 | Sioufi Filho |
| 2010/0274914 A1 | 10/2010 | Birch et al. |
| 2010/0299615 A1 | 11/2010 | Miluzzo et al. |
| 2011/0041153 A1 | 2/2011 | Simon et al. |
| 2012/0079046 A1 | 3/2012 | Murphy |
| 2012/0084364 A1 | 4/2012 | Sivavakeesar |
| 2013/0133087 A1 | 5/2013 | Proctor et al. |

OTHER PUBLICATIONS

International Search Report and Written Opinion for PCT/US2008/003000, Jun. 26, 2008.

Roger McFarlane, Network Software Architectures for Real-Time Massively-Multiplayer Online Games, Feb. 2, 2005.

EngTech, How to Get an RSS Feed for your XBOX 360 Gamertag, Mar. 31, 2008, pp. 1-7.

Duncan Mackenzie, Connect your XBOX 360 Gamertag to Twitter, May 11, 2007, pp. 1-5.

Psychostats, PsychoStats, Oct. 11, 2007, pp. 1-2.

Blizzard, The Armory, Oct. 2, 2007, pp. 1-3.

Kuester et al., Virtual Explorer: A Plugin-Based Virtual Reality Framework, SPIE Proceedings, The International Society for Optical Engineering, vol. 4297, Jan. 22, 2001.

* cited by examiner

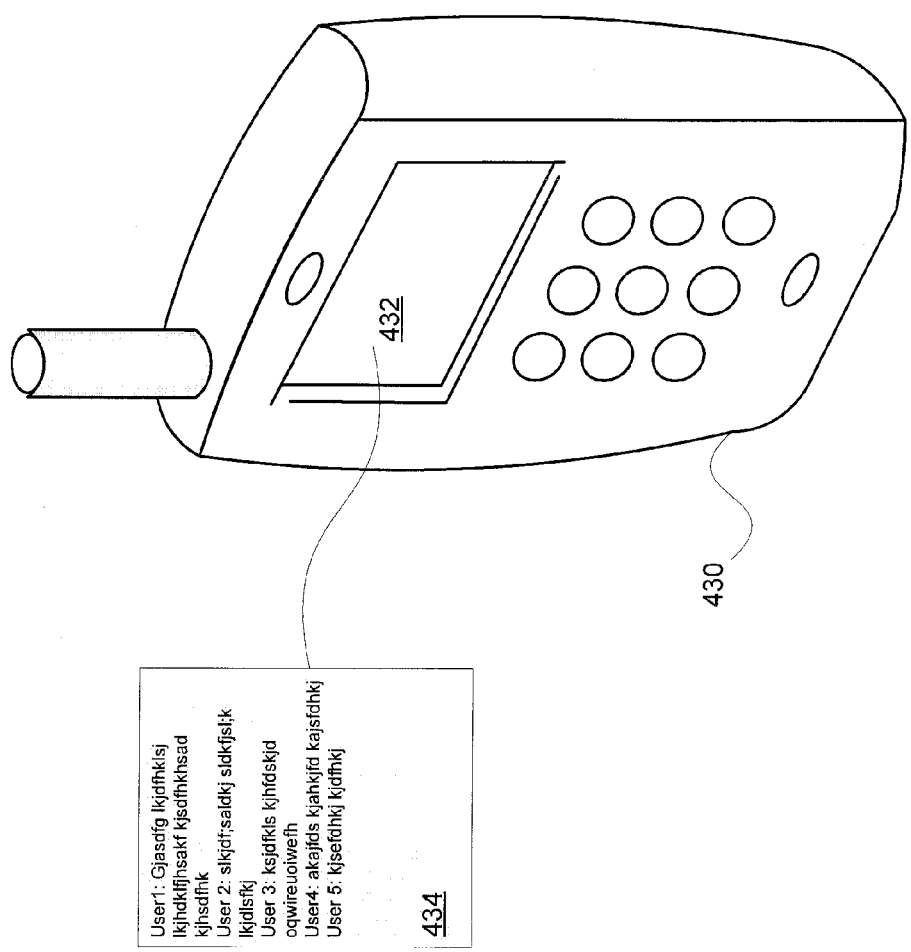

CROSS-INTERFACE COMMUNICATION

CROSS-REFERENCES TO RELATED APPLICATIONS

This application is related to co-pending U.S. patent application Ser. No. 12/259,902, filed Oct. 28, 2008 and entitled "Persistent Synthetic Environment Message Notification," U.S. patent application Ser. No. 12/399,877, filed Mar. 6, 2009 and entitled "Synthetic Environment Character Data Sharing," and U.S. patent application Ser. No. 12/399,902, filed Mar. 6, 2009 entitled "Synthetic Environment Character Data Sharing," all of which are herein incorporated by reference for all purposes.

FIELD OF THE INVENTION

The present invention relates to generally to software, computer program architecture, and data network communications. More specifically, techniques for cross-interface communication are described.

BACKGROUND

Gaming applications, game platforms, and games (generally, "gaming") include massively multiplayer online games ("MMOG," "MMO"), massively multiplayer online role playing games ("MMORPG"), console games, desktop or personal computer games, and others. MMOGs, MMOS, and MMORPGs are games that allow numerous players to interact with and within a virtual world. Using the Internet and other types of data networks, users (e.g., persons using computing devices and resources to engage in MMOG, MMO, MMORPG, or other types of games) can also communicate with each other within a game environment. However, conventional techniques for communication within game environments are limited and problematic.

Conventional virtual worlds or game environments and application or communication interfaces ("interfaces") are limited in both capability and performance. For example, some conventional interface solutions are generally limited to a single server configured to implement a game environment. Conventional solutions using a single server and, in some conventional solutions, a backup server typically restrict the types of processes and functions that are performed by users within a game environment, such as communication. Some conventional solutions use multiple servers. However, each server in a multiple server implementation is typically used to instantiate a specific region of a world or a given set of functions, thus creating a single-server limitation for communication within a multiple server-implemented game environment. Other problems with conventional solutions include limiting player communication to simple in-game message exchanges such as chat or instant messaging, typically using proprietary systems that limit game appeal, user adoption, and commercial potential for revenue generation.

In conventional solutions, a user can communicate with another user playing within the same game environment because user accounts are typically assigned to the same server. However, users are typically unable to communicate with other users located in different regions of a game environment until a user enters the same game environment, which is enabled by the same server. Further, conventional solutions do not allow users to communicate with other users outside of a game environment (i.e., users who are not logged into or interacting within a virtual environment) due to conventional application game architecture, restrictive conventional network topologies for game implementations, inability to process large volumes of real-time or near real-time communication data, lack of interfaces across different applications, platforms, and game environments, and the development and use of proprietary messaging applications, formats, and protocols associated with specific games, game titles, and game platforms.

Other conventional solutions are limited in the ability to convert, interpret or otherwise handle data in alternative data formats or protocols other than those specifically created for the game environment (i.e., native to the game environment or system). For example, a conventional game may have a native messaging system that allows users to "chat" or engage in instant or short messaging between each other. However, conventional native messaging system solutions are unable to integrate or otherwise work with other messaging systems. Conventionally, multi-server game environments do not permit communication entirely between user accounts hosted by different servers, particularly if one shard is used to implement a given region and another shard is used to implement a different region and the users are not interacting within the same region of a game environment.

Thus, what is needed is a solution for game communication without the limitations of conventional techniques.

BRIEF DESCRIPTION OF THE DRAWINGS

Various embodiments of the invention are disclosed in the following detailed description and the accompanying drawings:

FIG. 4B illustrates an alternative exemplary interface associated with cross-interface communication using a mobile communication device;

DETAILED DESCRIPTION

Figure 1:
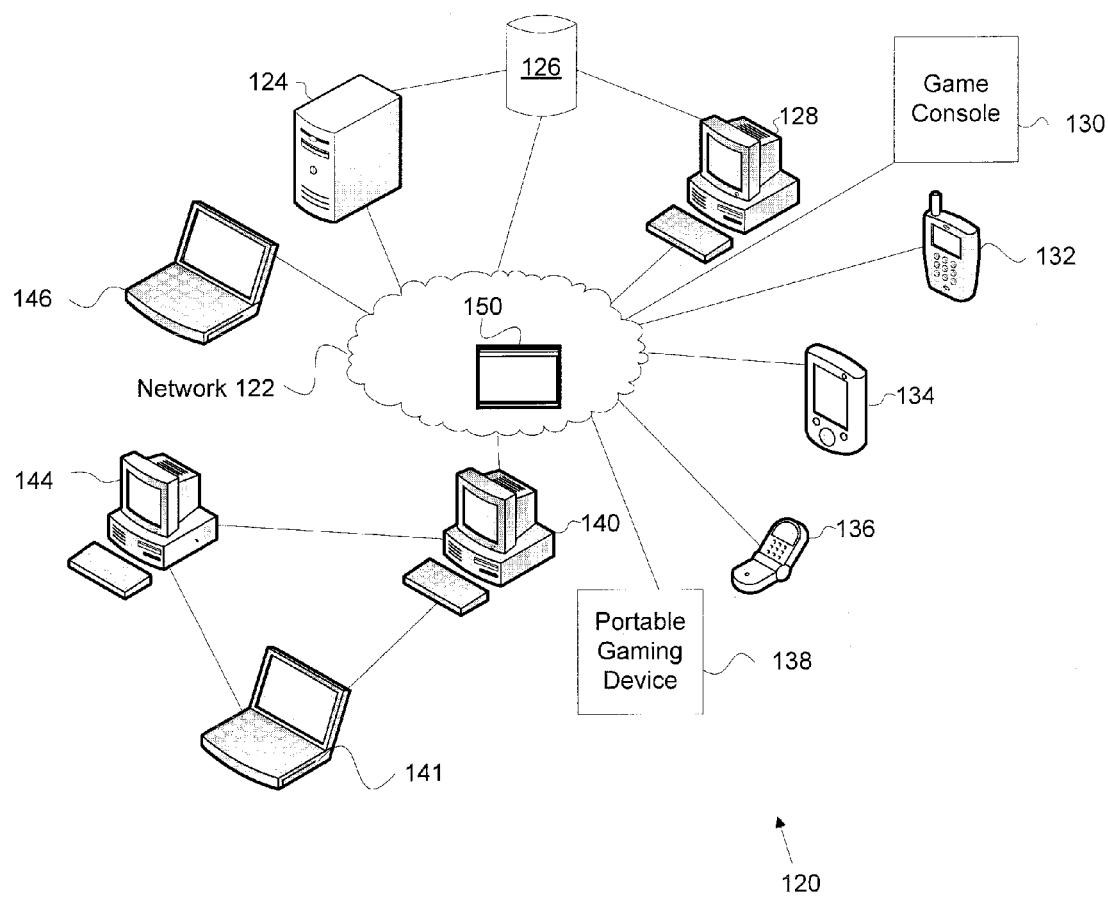
FIG. 1 illustrates an exemplary system configured to implement cross-interface communication.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Adobe® Integrated Runtime™ (Adobe®) AIR™), ActionScript™, Flex™, Lingo™, Java™, Javascript™, Ajax, Perl, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Techniques for cross-interface communication are described, including receiving messages associated with activities or events within a persistent virtual world, game environment, or synthetic environment ("synthetic environment"), determining a protocol or format associated with the message and identifying one or more recipients of the message. In some examples, the one or more recipients may be identified based on evaluating a sending user's account for a friends list, guild list, distribution list, or other user-provided indication of recipients, destination accounts, or receiving users of a message. Automatically or manually-generated messages may be received, interpreted, configured, transformed, and sent in various formats, without limitation, to enable users (e.g., one or more users organized and interacting with a virtual environment as a single individual character or as a group of characters (i.e., users) in organizational units such as a group of users, community of users, a guild, party, team, unit, fire team, squad, platoon, company, battalion, regiment, regimental combat team, brigade, brigade combat team, division, army, and the like) to communicate in real-time or near real-time while logged into or out of a synthetic environment. For example, a user "logged into" (i.e., interacting with) a synthetic environment may send messages to other users interacting within the synthetic environment or other, different synthetic environments. Using the described techniques, users may also send messages to other users who are "logged out," altogether not interacting with a synthetic environment, interacting with a different synthetic environment or game, or interacting with the same or different game implemented on the same or different shard. Regardless, the above-described examples may be implemented using various types of application programming or communication interfaces to transform messages into a desired instant messaging format for delivery to a user regardless of whether a recipient (i.e., another user) is interacting with a synthetic environment. Alternatively, the disclosed techniques may be used by different users of different or multiple synthetic environments to communicate with each other. In other examples, the described techniques may be varied and are not limited to those described.

FIG. 1 illustrates an exemplary system configured to implement cross-interface communication. Here, system 120 includes network 122, server 124, repository 126, client 128, gaming console 130, wireless clients 132-136, portable gaming device 138, networked clients 140-144, and client 146 and graphical user interface ("interface") 150. In some examples, interface 150 may be accessed from any type of endpoint, device, client, peer, or the like, including clients 128-146 (i.e., "endpoint"). Clients 128-146 may be wired, wireless, mobile, and in data communication with server 124 using any type of public or private data network or topology. In other examples, the number, type, configuration, and topology of system 120, network 122, clients 128-146, and server 124 may be varied and are not limited to the descriptions provided.

Here, any of clients 128-146 and server 124 may access network 122 using interface 150. In some examples, interface 150 may be associated with a common, shared, or otherwise connected ("connected") application that allows users to view, read, and access other users' generated data. The number, type, configuration, or other variation of servers (e.g., server 124) may be implemented using more or different types of servers and is not limited to the example shown and described here. For example, another server may be used to implement a synthetic environment that is different than that implemented by server 124. Further, a synthetic environment may also be implemented by one or more of client 128, gaming console 130, wireless clients 132-136, portable gaming device 138, networked clients 140-144, and client 146. In other examples, network application 120 and the above-described elements may be implemented differently and are not limited to the descriptions provided.

Figure 2A:
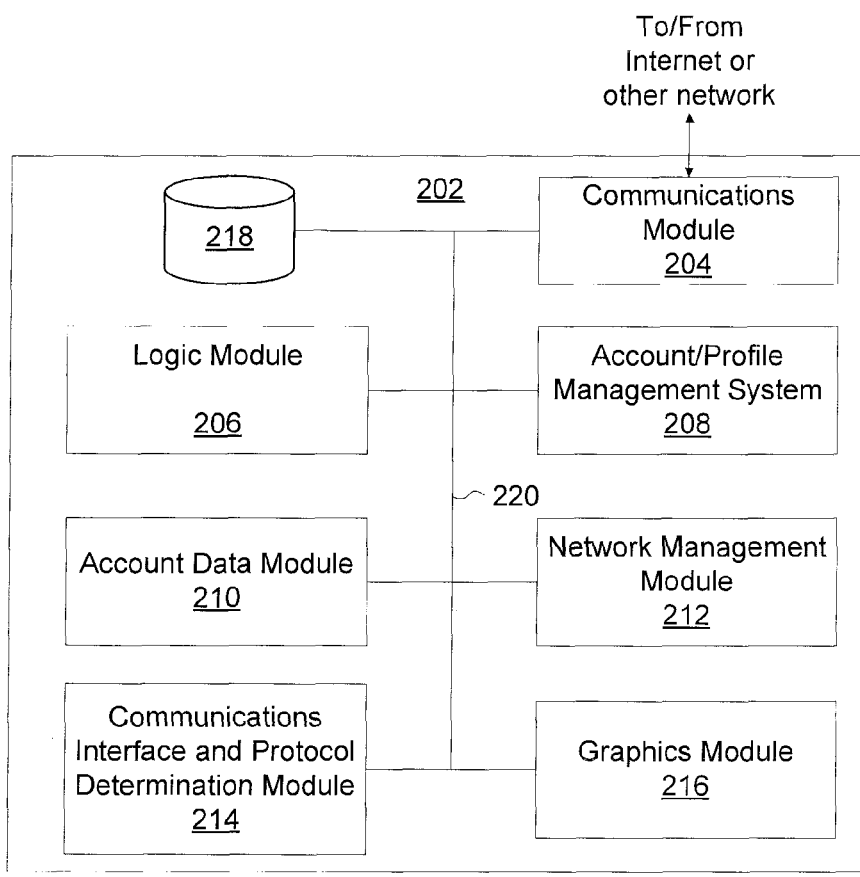
FIG. 2A illustrates an exemplary application architecture configured to implement cross-interface communication.

FIG. 2A illustrates an exemplary application architecture configured to implement cross-interface communication. Here, application 202 includes communications module 204, logic module 206, account/profile management system 208, account data module 210, network management module 212, communications interface and protocol determination module 214, graphics module 216, repository 218 and bus 220. In some examples, repository 218 may be implemented as a database, data mart, data warehouse, storage area network (SAN), redundant array of independent disks (RAID), or other storage facility. In other examples, repository 218 may be implemented differently than as described above.

Here, communications module 204 is configured to provide an interface for sending and receiving data from application 202 and to route data and signals to one or more of logic module 206, account/profile management system 208, account data module 210, network management module 212, communications interface and protocol determination module 214, graphics module 216, and repository 218 by generating and transmitting control signals and data over bus 220. In some examples, logic module 206 may be configured to implement control functions over some or all of modules 204-216 and repository 218. Further account/profile management system 208 may be configured to enable access to or from a user account associated with a synthetic environment. In some examples, account data module 210 may be configured to provide access, control, management, or other functions associated with data in a given account (e.g., personal inventory, avatar status, life, game, synthetic environment, or other types of data). Still further, network management module 212 and graphics module 216 may be configured to route data and to render various types of displays on an electronic, computer, or other type of display, respectively. As described below, communications module 204, in association with some, none, or all of logic module 206, account/profile management system 208, account data module 210, network management module 212, communications interface and protocol determination module 214, graphics module 216, and repository 218, may be used to implement the described techniques.

In some examples, communications module 204 provides data input from and output to an operating system, display, network or other application configured to implement application 202. In some examples, data input to communications module 204 may be a parameter associated with a synthetic environment (e.g., a persistent virtual world, game environment, or the like may be implemented using any type of computing system architecture configured to implement an artificial environment in which users (e.g., players) may interact using characters, avatars, or other virtual, multimedia-implemented constructs). In other examples, data input to or information output from communications module 204, logic module 206, account/profile management system 208, account data module 210, network management module 212, and graphics module 216 may be received or sent using communications interface and protocol determination module 214.

In some examples, data associated with a synthetic environment may be generated by account/profile management system 208, account data module 210 and graphics module 216. The data may be configured for transmission using network management module 212 and communications interface and protocol determination module 214. Communications module 204 and communications interface and protocol determination module 214 may be configured to receive, interpret, handle, or otherwise manage input received from the internet of other network. In other examples, application 202 and the above-described elements may be implemented differently and are not limited to the descriptions provided.

Figure 2B:
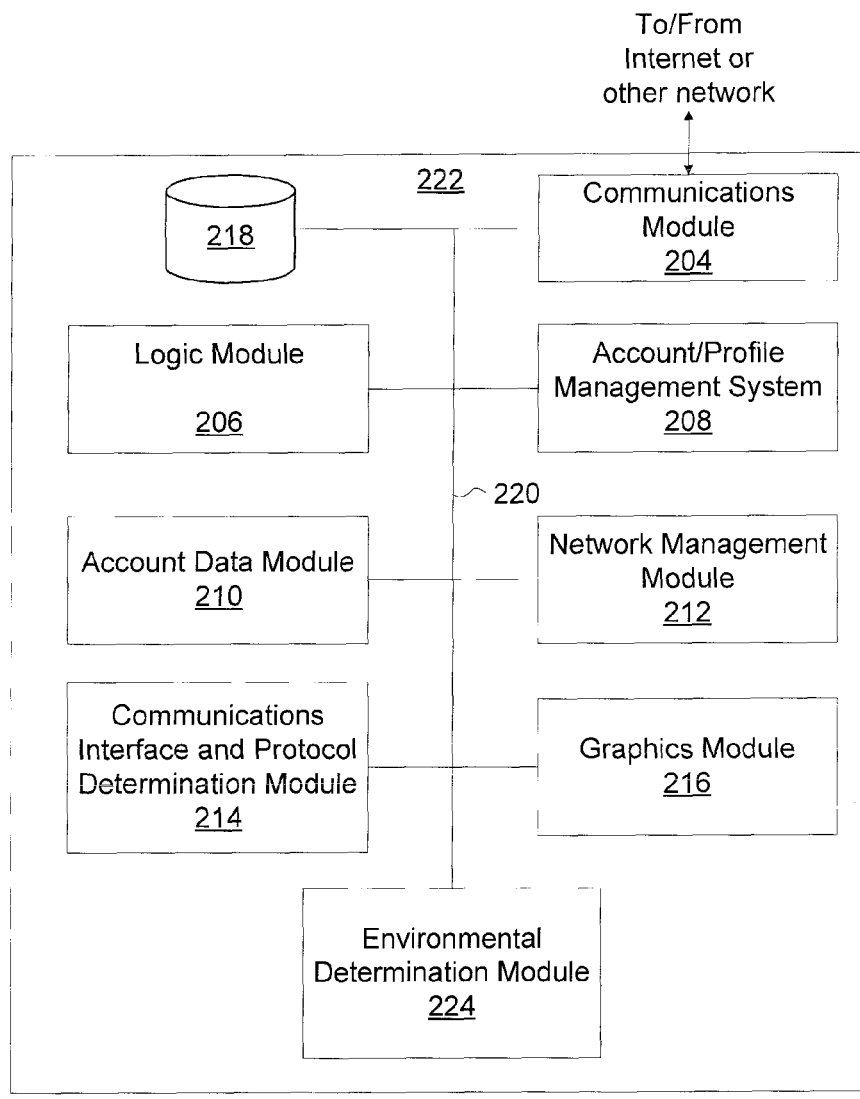
FIG. 2B illustrates an alternative exemplary application architecture configured to implement cross-interface communication.

FIG. 2B illustrates an alternative exemplary application architecture configured to implement cross-interface communication. Here, application 222 includes communications module 204, logic module 206, account/profile management system 208, account data module 210, network management module 212, communications interface and protocol determination module 214, graphics module 216, repository 218, bus 220, and environmental determination module 224. In some examples, communications module 204, logic module 206, account/profile management system 208, account data module 210, network management module 212, communications interface and protocol determination module 214, graphics module 216, repository 218, bus 220 may be implemented in design, function, and/or structure similarly or substantially similar to those techniques described above in FIG. 2A. Environmental determination module 224 may be implemented as software, hardware, circuitry, or a combination thereof. In some examples, environmental determination module 224 may be configured to determine whether an endpoint is within (i.e., logged into) or without (i.e., logged out of) a synthetic environment. In other words, when a message is to be generated for cross interface communication using the techniques described herein, environmental determination module 224 evaluates data sent to or received from an endpoint to determine whether a message is to be generated and sent to an endpoint logged into a synthetic environment. If an endpoint is logged into a synthetic environment (e.g., a user has logged into a synthetic environment from a desktop computer), environmental determination module 224 may be configured to identify the status of the endpoint by, for example, querying the endpoint for an identifying number (e.g., ID) and comparing the returned ID against a list, table, queue, or other data structure listing known IDs logged into a given synthetic environment at a given point in time. As another example, environmental determination module 224 may poll a given endpoint and, when a data packet is returned, a determination may be made based on data contained within the data packet as to whether the endpoint has logged into or out of a synthetic environment. In other examples, environmental determination module 224 may also determine that endpoints may be sending messages across interfaces associated with different synthetic environments, shards, non-synthetic environments, or other types of environments beyond those described here without limitation. As an example, a user logged into a synthetic environment may send a message to a user logged into a different synthetic environment (e.g., two users playing two different games implemented on the same or different shards), or a user who is associated with a synthetic environment (i.e., has an account established with a given game) and who is not logged into the synthetic environment, but is using a text or instant messaging application on her cell phone to receive messages from users logged into and out of a synthetic environment. In still other examples, different types of environments may be determined by environmental determination module 224 and is not limited to those shown and described.

In some examples, once an environment associated with an endpoint has been determined by environmental determination module 224, data may be transmitted to one or more of modules 204-216 and repository 218. As an example, when an environment associated with a sending endpoint identified to receive a message from a receiving endpoint, data may be sent to communications interface and protocol determination module to generate a message from the sending endpoint to the receiving endpoint. For example, if a user logged into and interacting with a synthetic environment sends a message to another user who is not logged into the synthetic environment, but who is using her mobile data communication device (e.g., wireless clients 132-136, portable gaming device 138, or others), environmental determination module 224 may signal (i.e., send data to) communications interface and protocol determination module 214 instructing the generation of a message for a given data communication protocol for the receiving user's device. Various types of data communication protocols may be used for constructing messages by one or more elements of application 222 (e.g., wireless application protocol (WAP), transmission control protocol (TCP/IP), binary runtime environment for wireless (BREW), and others without limitation). In other examples, application 222 and the above-described elements may be varied and are not limited to the descriptions shown and provided.

Figure 3A:
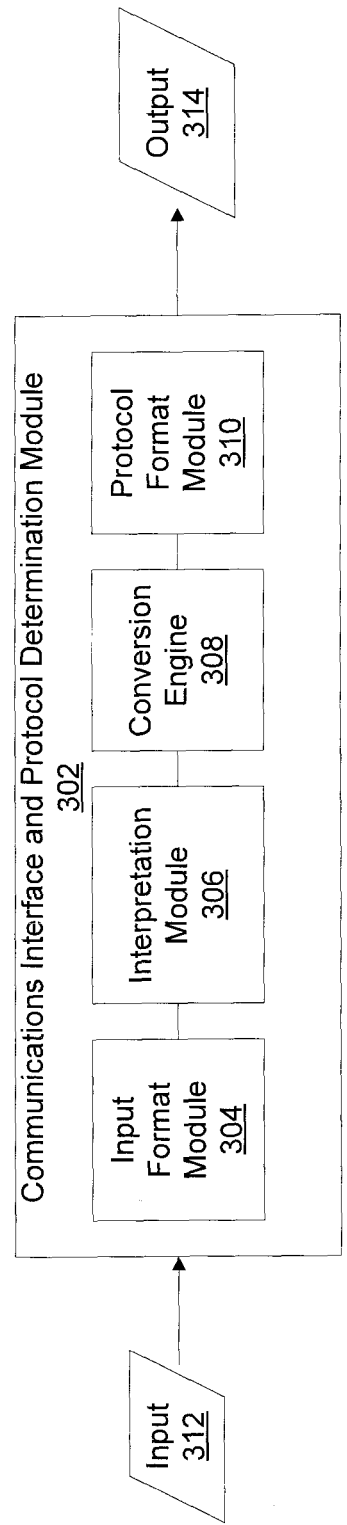
FIG. 3A illustrates an exemplary communications interface and protocol determination module.

FIG. 3A illustrates an exemplary communications interface and protocol determination module. Here, communications interface and protocol determination module 302 includes input format module 304, interpretation module 306, conversion engine 308, protocol format module 310, input data 312, and output data 314. In other examples, the type, quantity, configuration, function, appearance, layout, design, format, or other aspects or attributes of communications interface and protocol determination module 302 and the elements shown may be varied and are not limited to those shown and described.

Here, communications interface and protocol determination module 302 may be implemented as software, hardware, circuitry, or a combination thereof and is configured to manage data transmission over a data communication link or path ("data communication path") between recipients (e.g., sending or source user account, end devices, destination accounts (i.e., user accounts identified on a user's friends list, guild list, or other grouping or collection of addresses, indicators, user names, or other account identifiers), or other receiving accounts of messages sent by from an account) by identifying data communication protocols, formats, or other attributes of a message. Messages may, in some examples, be sent between various types of users or sets of users (e.g., a group of users, community of users, a guild, party, team, unit, fire team, squad, platoon, company, battalion, regiment, regimental combat team, brigade, brigade combat team, division, army, and the like). In some examples, communications interface and protocol determination module 302 receives data input from and provides data output to an operating system, display, network or other application configured to implement communications interface and protocol determination module 302. Communications interface and protocol determination module 302 may be configured to receive, interpret, handle, or otherwise manage input received from the internet or other network. The data may be configured for transmission using some, none, or all of, input format module 304, interpretation module 306, conversion engine 308, and protocol format module 310.

In some examples, input format module 304 may be configured to receive a message including input data 312. Input data 312 may, in some examples, include data retrieved from one or more sources of data or information associated with a synthetic environment. As an example, input data 312 may be retrieved from one or multiple sources (e.g., repository 218 (FIG. 2)) in real-time or substantially real-time. When received, input data 312 is evaluated by input format module 304 to determine the data communication protocol and format that was used to format input data 312 by a source (e.g., sending user account). After determining the data communication protocol and format used to format input data 312, interpretation module 306 interprets the message and included input data 312 to identify, for example, component parts or elements of a message in order to allow conversion engine 308 to convert the message into indicated formats for destination accounts or recipients ("destination accounts"). When a message has been converted, protocol format module 310 formats an outgoing message to the formats and protocols as identified by a user's friends list, guild list, preferences, filters, or other parameters. For example, a user may wish to email her friends whenever her account's character engages in combat within the synthetic environment. Her friends may be identified by user names or other identifies that are coupled to a profile including email addresses. When a message is converted, recipients may be identified by reviewing her friends list to determine which of her friends are to receive email notifications that she is engaged in combat. As another example, communications interface and protocol determination module 302 may be implemented to enable users to engage in real-time or substantially real-time chat, instant messaging or similar communication. An instant or chat message sent using a first protocol, processed as input data 312, and sent as output data 314 configured as an instant or chat message in the same, similar, or different format and protocol. For example, an instant message sent using extensible messaging and presence protocol (XMPP) may be processed as described above and sent to recipients using open system for communication in realtime (OSCAR) protocol, or other types of instant messaging or chat-based communication interfaces, protocols, or formats, without limitation. In other examples, communication interface and protocol determination module 302 and the above-described elements may be implemented differently and are not limited to the descriptions provided.

Figure 3B:
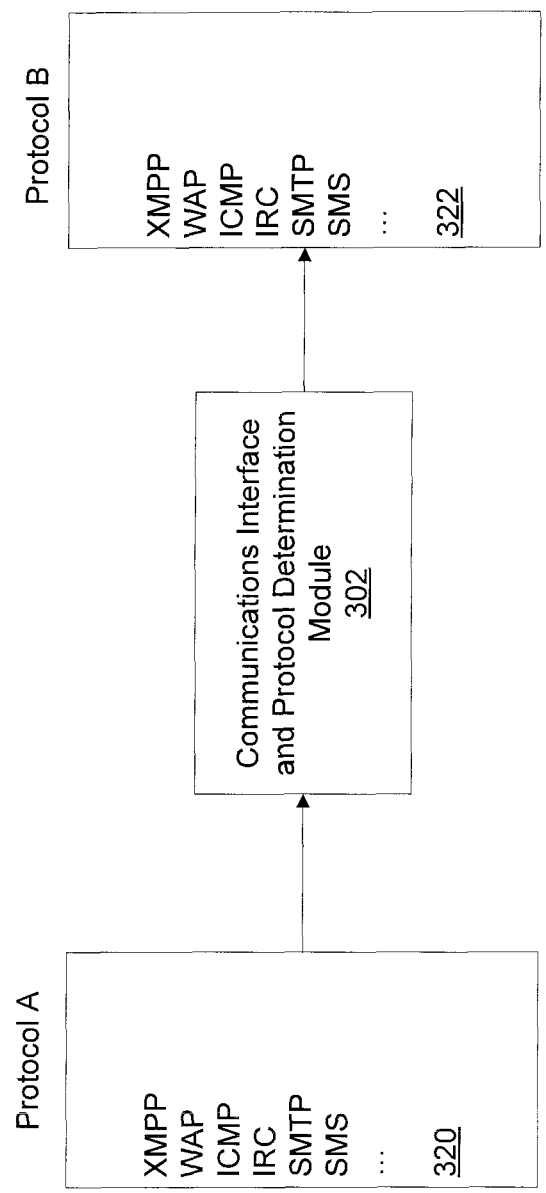
FIG. 3B illustrates data format conversion using an exemplary communications interface and protocol determination module.

FIG. 3B illustrates data format conversion using an exemplary communications interface and protocol determination module. Here, protocol 1 (320) is shown as a communication protocol (e.g., XMPP/Jabber, wireless application protocol (WAP), Internet control message protocol (ICMP), Internet relay chat (IRC), Property Class™ as developed by Trion World Network®, Inc. of Redwood Shores, Calif., short messaging system (SMS), simple message transfer protocol (SMTP), or others). Protocol 2 (322) is also shown as a communication protocol such as those described above with regard to Protocol 1 (320). In other examples, protocol 1 (320) and protocol 2 (322) may be other communication protocols and are not limited to the examples provided.

Here, communications interface and protocol determination module 302 may be configured to convert protocol 1 (320) to protocol 2 (322). In some examples, communications interface and protocol determination module 302 may be configured to allow protocol 2 (322) to interpret protocol 1 (320). In other examples, communications interface and protocol determination module 302 may be configured differently to implement cross-interface communication and is not limited to the examples provided.

Figure 4A:
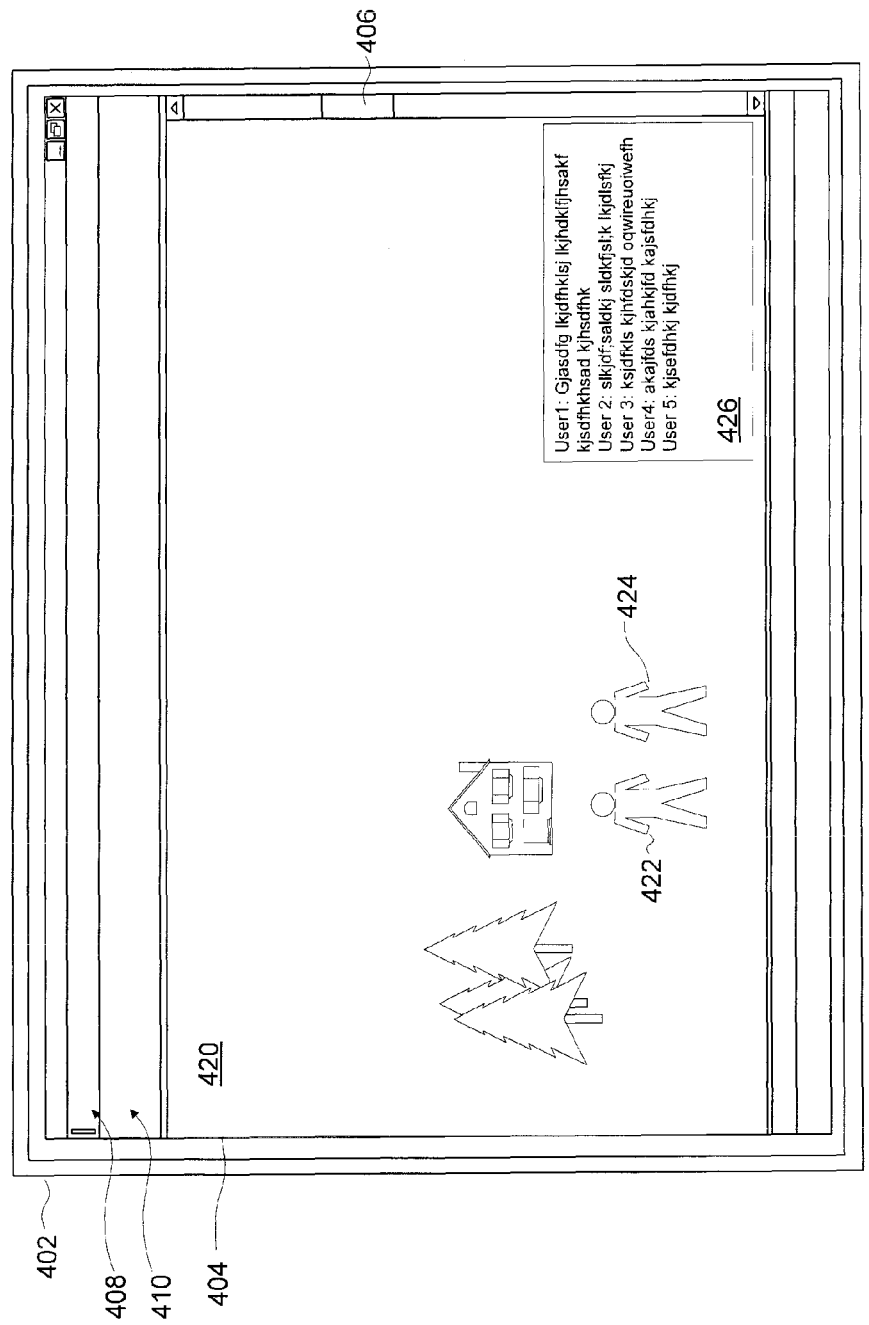
FIG. 4A illustrates an exemplary interface associated with cross-interface communication.

FIG. 4A illustrates an exemplary interface associated with cross-interface communication. Here, interface 402 includes display 404, scroll bar 406, tool bar 408, menu bar 410, synthetic environment 420, virtual users 422-424 and communication interface 426. In some examples, synthetic environment 420, virtual users 422-424 and communication interface 426 are presented in display 404, which provides examples of how messages may be presented on an interface associated with a destination account or recipient. In other examples, synthetic environment 420, virtual users 422-424 and communication interface 426 may be presented elsewhere and are not limited to the examples provided. Interface 402 and the described elements may be varied in function, quantity, configuration, layout, appearance, design, or other aspects or attributes and are not limited to the examples shown and described.

Here, communication interface 426 is presented as a multi-user chat application. In other examples, communication interface 426 may be presented as another communication application (e.g. electronic mail, instant messenger, mobile text messenger, peer-to-peer chat, or others). In other examples, communication interface 426 may be another communication application and is not limited to the descriptions provided. As shown here, communication interface 426 is shown as a geometric text box. In some examples, communication interface 426 may be presented as a dynamic news ticker. In other examples, the configuration of the appearance of communication interface 426 may be varied and is not limited to the description provided.

In some examples, communication interface 426 is associated with synthetic environment 420. In some examples, communication interface 426 may be associated with other network communication systems (e.g. mobile communication device, distributed data network, or others). In other examples, communication interface 426 may be associated with other communication systems and is not limited to the description provided.

As shown here, synthetic environment 420 is a persistent virtual world populated by virtual users 422-424. Communication interface 426 provides users 422-424 with a data communication link with each other, and others. User 422 may be user 1. User 424 may be user 2. As shown in communication interface 426, users 3-5 may be associated with another location within synthetic environment 420. In other examples, users 3-5 may be associated with another location outside synthetic environment 420. Still further, users 3-5 may be associated with another communication system (e.g., mobile communication device, distributed data network) as described above. In other examples, users associated with communication interface 426 may be associated with other communication systems, either within or outside a synthetic environment, and are not limited to the descriptions provided.

FIG. 4B illustrates an alternative exemplary interface depicting cross-interface communication. Here, interface 430 includes display 432, and communication interface 434. Here, communication interface 434 is presented in display 432. In other examples, communication interface 434 may be presented differently and is not limited to the examples provided.

Here, communication interface 434 is presented as a multi-user chat application. In other examples, communication interface 434 may be presented as another communication application (e.g. electronic mail, instant messenger, mobile text messenger, peer-to-peer chat, or others). In other examples, communication interface 434 may be another communication application and is not limited to the descriptions provided. As shown here, communication interface 434 is shown as a geometric text box. In other examples, the configuration of the appearance of communication interface 434 may be varied and is not limited to the description provided.

Here, communication interface 434 is associated with a mobile communication device. In some examples, communication interface 434 may be associated with other network communication systems (e.g. distributed data network, or others). In other examples, communication interface 434 may be associated with other communication systems and is not limited to the description provided.

Figure 4C:
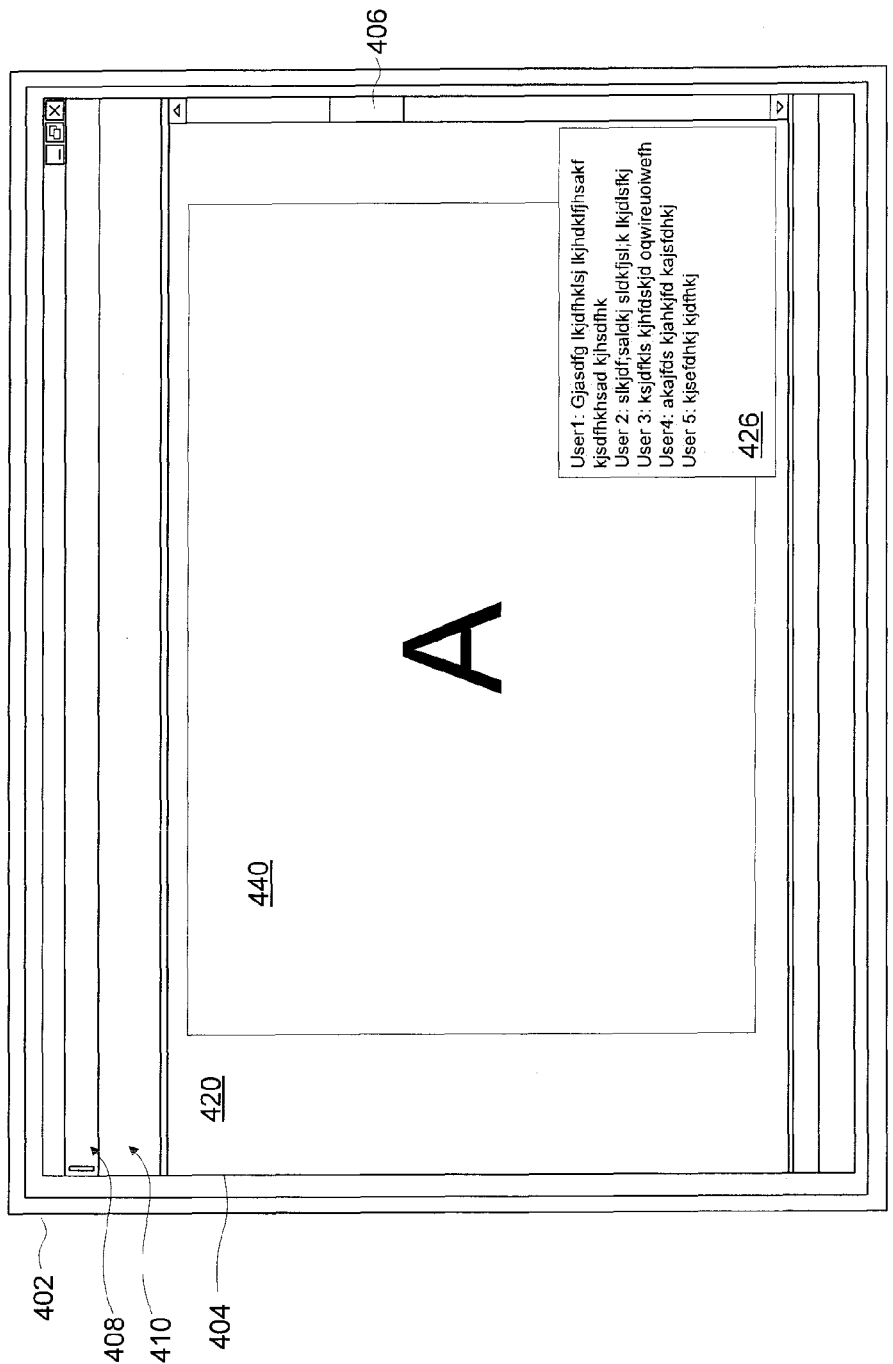
FIG. 4C illustrates an exemplary interface associated with cross-interface communication.

FIG. 4C illustrates an exemplary interface associated with cross-interface communication. Here, interface 402 includes display 404, scroll bar 406, tool bar 408, menu bar 410, synthetic environment 420, virtual users 422-424 and communication interface 426. Interface 402 may be similar or substantially similar to interface 402 shown and described in FIG. 4A. Alternatively, a user may be logged out of (i.e., not interacting with a synthetic environment) and working, for example, on document "A" 440 when communication interface 426 may appear, displaying information sent by another user who may be logged into or out of a synthetic environment. As another example, a user may be using an application such as a web browser, email application, desktop/office productivity, or any other type of application not associated with a synthetic environment and communication interface 426 may be presented on interface 402. Further, interface 402 may be an example of an interface that is configured to display on any type of client (e.g., desktop, notebook/laptop, server, or other type of computing device, without restriction). Still further, in other examples, interface 402 and the above-described elements may be varied in design, layout, function, structure, or implementation and are not limited to those shown and described.

Figure 5A:
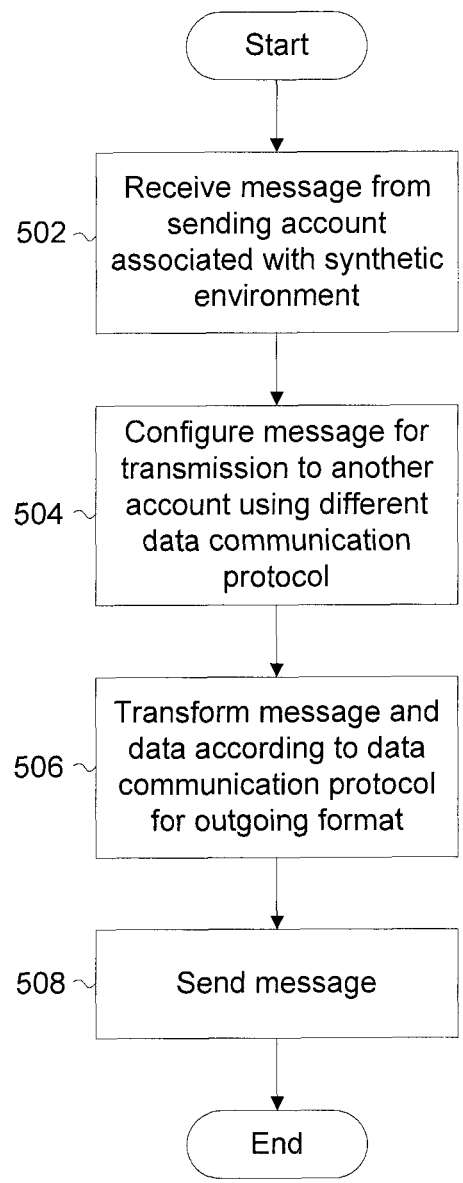
FIG. 5A illustrates an exemplary process for cross-interface communication.

FIG. 5A illustrates an exemplary process for cross-interface communication. Here, a message is received from an account associated with a synthetic environment (502). Once received, a message for transmission to another account (e.g., a user logged into a synthetic environment using her account may transmit a message to another user who is not logged into the synthetic environment) may be configured based on the data communication protocol for the intended recipient (i.e., destination) (504). For example, if a user is logged into a synthetic environment and sends a message to another user on his mobile web browser on his cell phone, the message may be configured for receipt at a destination (e.g., end device such as a smart phone, cell phone, mobile computing or communications device, desktop computer, notebook/laptop computer, personal computer, server, and others) outside of the synthetic environment. Examples of activities included with configuring the message for receipt by an account using a different data communication protocol than the sending protocol may include saving a copy of the message to a database or other repository (e.g., 218 (FIG. 2)), identifying the type of receiving end device at the destination, and others. Configuring a message for transmission to another account is described in greater detail in the example provided in connection with FIG. 5B.

Referring back to FIG. 5A, a message, once configured, may be transformed according to the data communication protocol used by the receiving destination (506). As an example, the receiving destination may include both SMTP ("simple mail transmission protocol") and TCP/IP ("transmission control protocol/Internet protocol")-based forms of electronic mail ("email"), a message may be transformed to both formats for transmission to the recipient. As another example, a destination may be a mobile web browser on a cell phone, smart phone, personal digital assistant (PDA), or the like configured to handle wireless application protocol ("WAP") transmitted data. A message may be formatted (e.g., using wireless mark up language (WML)) for transmission, interpretation and handling for a WAP browser. In some examples, after transformation, the message may be sent to one or more destinations. In other examples, multiple destinations may be identified to receive the message. The above-described techniques may be implemented to process a message to multiple recipients using different data communication protocols, without limit. The above-described process may be varied in function, operation, processes, and performed in any arbitrary order and is not limited to the examples shown and described.

Figure 5B:
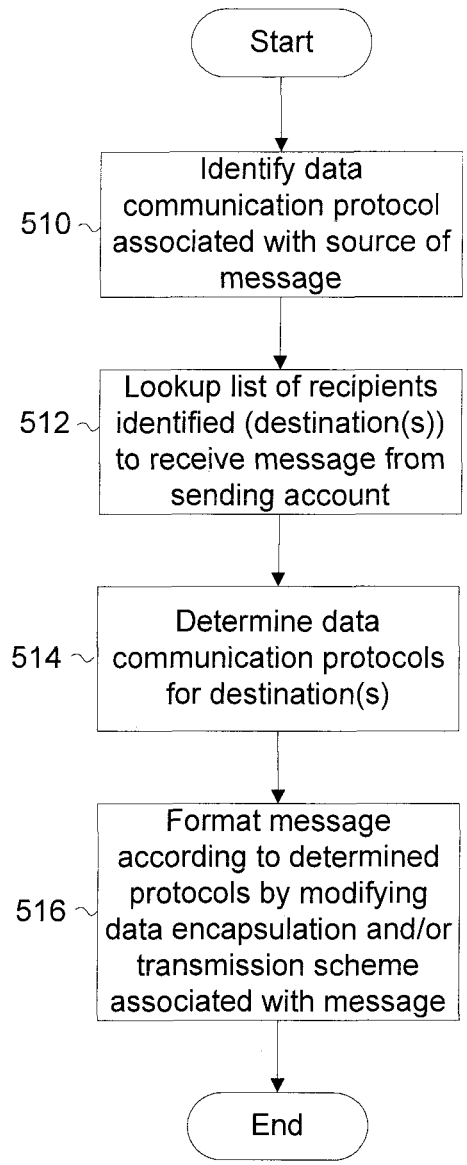
FIG. 5B illustrates an exemplary sub-process for cross-interface communication.

FIG. 5B illustrates an exemplary sub-process for cross-interface communication. In some examples, the described process may be implemented to configure a message for received by one or more recipients. Here, a data communication protocol associated with a message sent by an account is identified (510). A lookup operation or other function may be performed to identify one or more recipients (e.g., friends, email recipients, guild members, users, or other accounts associated with a synthetic environment) designated to receive messages from the sending account (512). For example, a user may identify in her account a list of friends to receive messages (e.g., emails, notifications, alerts, instant messages, and others) related to her activities or events affecting her within a synthetic environment. An account may be used to identify that a given recipient may wish to receive email using a mobile communication device, thus invoking the use of a protocol that may be different from other recipients. In other examples, the above-described techniques for identifying recipients (i.e., receiving user accounts) and data communication protocols may be modified and are not limited to the examples shown and described.

Once identified, a determination is made as to the type of data communication protocol being used by the one or more intended recipients (e.g., destinations) (514). Based on the determined data communication protocols, a message may be formatted according to one or more protocols determined for transmitting data to a recipient using various techniques. In some examples, messages may be formatted by modifying the data encapsulation scheme (i.e., method), algorithm, or structure associated with message data packets, segments, frames, or the like (516). Further, messages may also be modified by adding, deleting, or modifying data included in, for example, headers, footers, trailers, error correction checksum numbers, payload data, and others. In other examples, the above-described techniques may be varied based on the type of protocol and are not limited to any specific protocol. Using the techniques described above, messages may be sent by a user to multiple recipients who may be logged into an account associated with a synthetic environment, or who are outside of the synthetic environment, but able to receive messages using, for example, email, instant messages, web tickers, news feeds, RSS (e.g., really simple syndication), Atom, or other types of content syndication fees. The above-described process may be varied in function, processes and performed in any arbitrary order and is not limited to the examples shown and described.

Figure 5C:
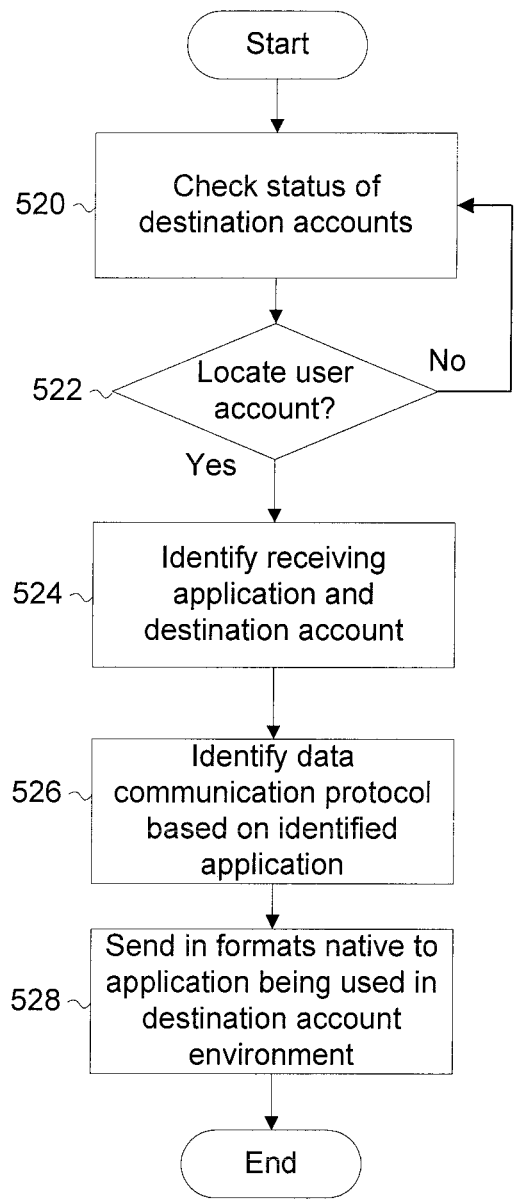
FIG. 5C illustrates an exemplary sub-process of cross-interface communication.
Figure 6:
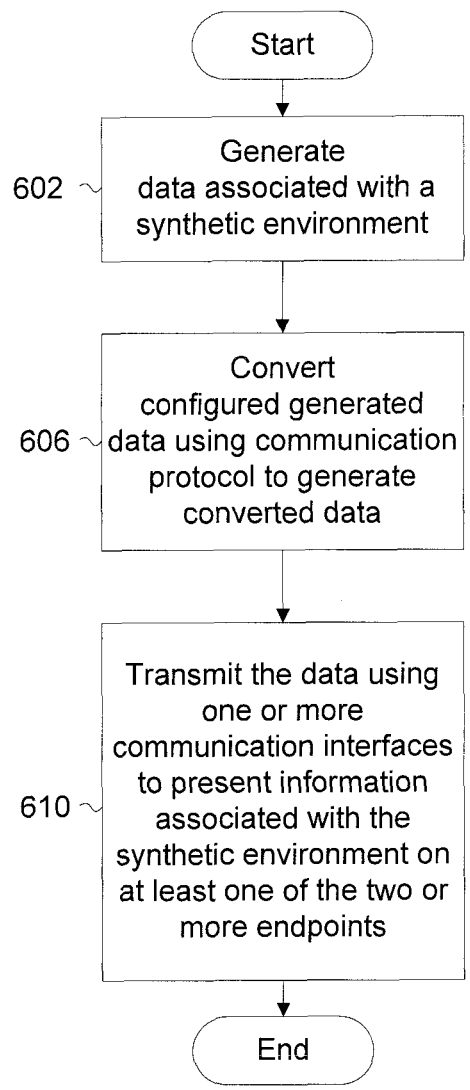
FIG. 6 illustrates an alternative exemplary process for cross-interface communication.

FIG. 5C illustrates an exemplary sub-process of cross-interface communication. Here, a check of the status of one or more intended destination accounts (i.e., an account intended or identified as a recipient of a given message) is made (520). By checking on the status of a destination account, a determination may be made as to a user account, regardless of whether it is logged into or out of a synthetic environment, in multiple places within a synthetic environment, or in multiple synthetic environments, clients, shards, games, or the like (522). If an account is located, then a message may be transmitted to the one or more destination accounts in a message format native to the environment associated with the one or more destination accounts and the application(s) being used on the destination accounts (524). If an account is not located, then a loop is performed until a user account is located and the type of receiving application (e.g., an email application, an instant messaging program, a web-based/POP (i.e., Point of Presence) email program using TCP/IP, or others) being used. In some examples, an application being used at a destination account may be identified using various techniques (e.g., checking a list of accounts identified by the sending user to determine if a given type of application was identified) (524). By determining the type of destination account, messages may be generated for transmission across different types of interfaces to be received by an intended destination account on the application in use or as otherwise specified by a user's profile or preferences, for example. When a receiving application used by the user of the destination account has been identified, then a data communication protocol associated with the type of receiving application identified earlier may also be identified (526). After identifying the receiving application associated with a destination account and the type of data communication protocol used by the receiving application, a message may be generated into the identified formats according to the identified protocols, as described above in connection with FIG. 5B. Once generated, the message may be sent in the format native to the applications being used in the destination account environment (528). Further, messages sent to a destination account may be queued or persist (i.e., when a user account is offline, messages may be retained for future delivery when a user account is online). In some examples, if a user account is offline, messages may be sent to a queue that may be implemented on a server or other computing device and, when the user account status returns to online, the messages may be delivered (i.e., sent) as described above. Alternatively, when the destination account environment changes, messages may persist to allow a user to view previous messages, chat histories, or the like on various types of devices. For example, if a user account is online and receiving messages in a mobile device environment and, when the user logs off and instead logs in using her account on a desktop computer, her messages persist and she is able to view her previous messages, message history/thread, or the like, regardless of the destination account environment or type of device being used. In other examples, the above-described process may be varied and is not limited to those shown and described. Further, the above-described process may be varied in function, processes and performed in any arbitrary order and is not limited to the examples shown and described FIG. 6 illustrates an alternative exemplary process for cross-interface communication. In some examples, data associated with a synthetic environment may be generated and configured for transmission using one or more communication protocols (602). The data may be converted using one of the one or more communication protocols to generate converted data that may be interpreted using another of the one or more communication protocols (606). Once converted data associated with a message may be transmitted over a communication path between two or more endpoints using one or more communication interfaces and may be used to present information associated with the synthetic environment on at least one of the two or more endpoints after it is interpreted by the other of the one or more communication protocols (606). The above-described process may be varied in function, processes and performed in any arbitrary order and is not limited to the examples shown and described.

Figure 7:
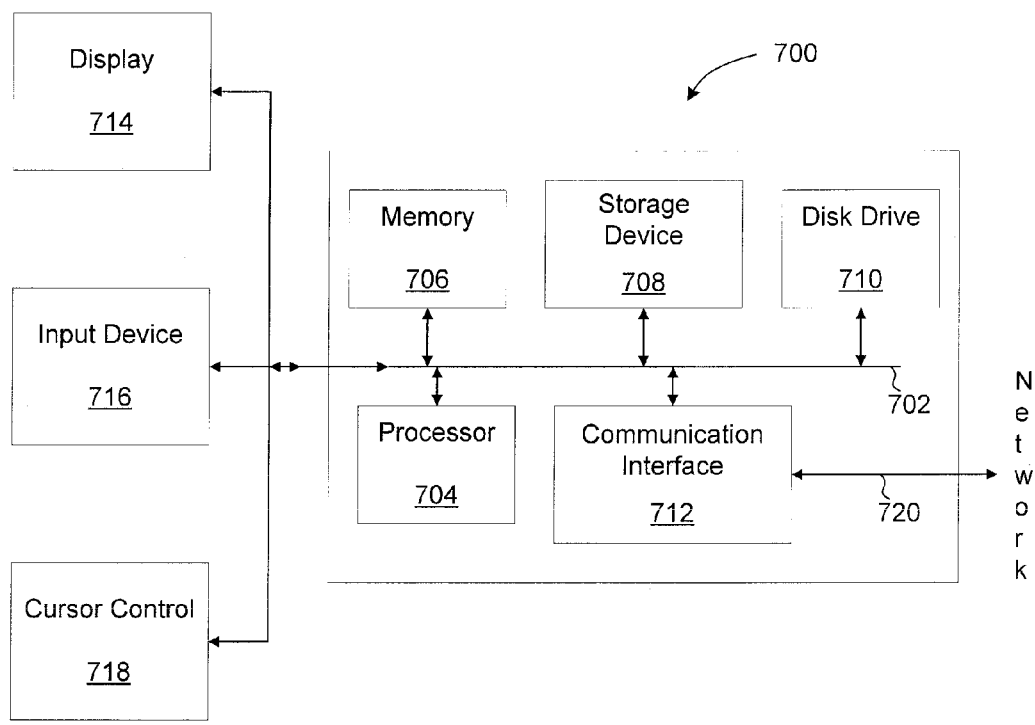
FIG. 7 illustrates an exemplary computer system suitable to implement cross-interface communication.

FIG. 7 illustrates an exemplary computer system suitable for cross-interface communication. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any tangible medium that participates in providing instructions to processor 704 for execution. Such a medium may take many forms, including but not limited to, non-volatile media and volatile media. Non-volatile media includes, for example, optical or magnetic disks, such as disk drive 710. Volatile media includes dynamic memory, such as system memory 706.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 702 for transmitting a computer data signal.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method, comprising:
    receiving from a first account a message in a first format associated with a first synthetic environment;
    determining whether the message is to be sent to an endpoint is one of: logged into the first synthetic environment, logged into a second synthetic environment, and not logged into any synthetic environment, the endpoint being associated with a second account, wherein the determining comprises:
        polling the endpoint to determining whether the endpoint is logged into one of the first or the second synthetic environments or not logged into any synthetic environment; and
        in the event that the endpoint is logged into one of the first or the second synthetic environments:
            querying the endpoint for an identifying number; and
            comparing the identifying number to a list of identifying numbers corresponding to accounts logged into one of the first or the second synthetic environments to determine whether the endpoint is logged into the first synthetic environment or the second synthetic environment;
    configuring the message to be transferred from the first account to the second account using a first communication interface implemented with the first synthetic environment, the first communication interface being configured to transfer data between the first synthetic environment and an application using a first protocol that is substantially different from a second protocol used with a second communication interface;
    transforming the message and the data using the first protocol to generate the message in a second format based on a friends' list, a guild list, a preference, or a filter; and
    sending the message in the second format from the first synthetic environment to the second account associated with the second synthetic environment using the first communication interface and the first protocol, the first protocol being one of extensible messaging and presence protocol (XMPP), Jabber, wireless application protocol (WAP), Internet control message protocol (ICMP), Internet relay chat (IRC), Property Class, short messaging system (SMS), or simple message transfer protocol (SMTP).

2. The method of claim 1, wherein the data is associated with an activity performed substantially within the first synthetic environment.

3. The method of claim 1, wherein the data is associated with an activity performed substantially outside of the first synthetic environment.

4. The method of claim 1, wherein the data is associated with an event occurring substantially within a persistent virtual world.

5. The method of claim 1, wherein the first synthetic environment is a persistent virtual world.

6. The method of claim 1, wherein the first account is logged into the first synthetic environment, and wherein the second account is logged into the second synthetic environment.

7. The method of claim 1, wherein the first protocol is a data transmission protocol associated with an instant messaging application.

8. The method of claim 1, wherein the first protocol is a data transmission protocol associated with an electronic messaging application.

9. The method of claim 1, wherein the second account is not logged into any synthetic environment.

10. The method of claim 1, wherein the first communication interface further comprises an application programming interface.

11. A method, comprising:
    generating data associated with a first synthetic environment, the first synthetic environment comprising one or more communication protocols;
    determining whether each of two or more endpoints is one of: logged into the first synthetic environment, logged into a second synthetic environment, and not logged into any synthetic environment, each of the two or more endpoints being associated with a different user, wherein the determining comprises:
        polling an endpoint to determining whether the endpoint is logged into one of the first or the second synthetic environments or not logged into any synthetic environment; and
        in the event that the endpoint is logged into one of the first or the second synthetic environments:
            querying the endpoint for an identifying number; and
            comparing the identifying number to a list of identifying numbers corresponding to accounts logged into one of the first or the second synthetic environments to determine whether the endpoint is logged into the first synthetic environment or the second synthetic environment;
    converting the data using a first of the one or more communication protocols to generate converted data based on a friends' list, a guild list, a preference, or a filter, wherein the converted data is interpreted using a second of the one or more communication protocols; and
    transmitting the data over a communication path between the two or more endpoints using one or more communication interfaces, wherein the data, after being interpreted by the second of the one or more communication protocols, is used to present information associated with the first synthetic environment on at least one of the two or more endpoints, the first of the one or more communication protocols being one of extensible messaging and presence protocol (XMPP), Jabber, wireless application protocol (WAP), Internet control message protocol (ICMP), Internet relay chat (IRC), Property Class, short messaging system (SMS), or simple message transfer protocol (SMTP).

12. The method of claim 11, wherein the data is associated with an activity occurring substantially inside the first synthetic environment.

13. The method of claim 11, wherein the data is associated with an activity occurring substantially outside the first synthetic environment.

14. The method of claim 11, wherein the first synthetic environment is a persistent virtual world.

15. The method of claim 11, wherein the one or more communication protocols comprises SMTP.

16. The method of claim 11, wherein the one or more communication protocols comprises TCP/IP.

17. The method of claim 11, wherein the one or more communications protocols is used by the one or more communication interfaces to send the data associated with an event occurring in the first synthetic environment to at least one of the one or more clients that is not logged into the first synthetic environment.

18. A system, comprising:
a memory configured to store data associated with a first synthetic environment; and
a processor configured to:
 receive from a first account a message in a first format associated with a first synthetic environment,
 determine whether the message is to be sent to an endpoint is one of: logged into the first synthetic environment, logged into a second synthetic environment, and not logged into any synthetic environment, the endpoint being associated with a second account, wherein the determining comprises:
  polling the endpoint to determining whether the endpoint is logged into one of the first or the second synthetic environments or not logged into any synthetic environment; and
  in the event that the endpoint is logged into one of the first or the second synthetic environments:
   querying the endpoint for an identifying number; and
   comparing the identifying number to a list of identifying numbers corresponding to accounts logged into one of the first or the second synthetic environments to determine whether the endpoint is logged into the first synthetic environment or the second synthetic environment;
 configure the message to be transferred from the first account to the second account using a first communication interface implemented with the first synthetic environment, the first communication interface being configured to transfer the data between the first synthetic environment and an application using a first protocol that is substantially different from a second protocol used with a second communication interface,
 transform the message and the data using the first protocol to generate the message in the second format based on a friends' list, a guild list, a preference, or a filter, and
 send the message in the second format from the first synthetic environment to the second account associated with the synthetic environment using the first communication interface and the first protocol, the first protocol being one of extensible messaging and presence protocol (XMPP), Jabber, wireless application protocol (WAP), Internet control message protocol (ICMP), Internet relay chat (IRC), Property Class, short messaging system (SMS), or simple message transfer protocol (SMTP).

19. A system, comprising:
a storage module configured to store data associated with a first synthetic environment; and
a logic module configured to:
generate data associated with the first synthetic environment, the first synthetic environment comprising one or more communication protocols,
determine whether each of two or more endpoints is one of: logged into the first synthetic environment, logged into a second synthetic environment, and not logged into any synthetic environment, each of the two or more endpoints being associated with a different user, wherein the determining comprises:
 polling an endpoint to determining whether the endpoint is logged into one of the first or the second synthetic environments or not logged into any synthetic environment; and
 in the event that the endpoint is logged into one of the first or the second synthetic environments:
  querying the endpoint for an identifying number; and
  comparing the identifying number to a list of identifying numbers corresponding to accounts logged into one of the first or the second synthetic environments to determine whether the endpoint is logged into the first synthetic environment or the second synthetic environment;
convert the data using a first of the one or more communication protocols to generate converted data based on a friends' list, a guild list, a preference, or a filter, wherein the converted data is interpreted using a second of the one or more communication protocols, and
transmit the data over a communication path between the two or more endpoints using one or more communication interfaces, wherein the data, after being interpreted by the second of the one or more communication protocols, is used to present information associated with the first synthetic environment on at least one of the two or more endpoints, the first of the one or more communication protocols being one of extensible messaging and presence protocol (XMPP), Jabber, wireless application protocol (WAP), Internet control message protocol (ICMP), Internet relay chat (IRC), Property Class, short messaging system (SMS), or simple message transfer protocol (SMTP).

20. A computer program product embodied in a non-transitory computer readable medium and comprising computer instructions for:
receiving from a first account a message in a first format associated with a first synthetic environment;
determining whether the message is to be sent to an endpoint is one of: logged into the first synthetic environment, logged into a second synthetic environment, and not logged into any synthetic environment, the endpoint being associated with a second account, wherein the determining comprises:
 polling the endpoint to determining whether the endpoint is logged into one of the first or the second synthetic environments or not logged into any synthetic environment; and
 in the event that the endpoint is logged into one of the first or the second synthetic environments:
  querying the endpoint for an identifying number; and
  comparing the identifying number to a list of identifying numbers corresponding to accounts logged into one of the first or the second synthetic environments to determine whether the endpoint is logged into the first synthetic environment or the second synthetic environment;

configuring the message to be transferred from the first account to the second account using a first communication interface implemented with the first synthetic environment, the first communication interface being configured to transfer data between the first synthetic environment and an application using a first protocol that is substantially different from a second protocol used with a second communication interface;

transforming the message and the data using the first protocol to generate the message in a second format based on a friends' list, a guild list, a preference, or a filter; and sending the message in the second format from the first synthetic environment to the second account associated with the synthetic environment using the first communication interface and the first protocol, the first protocol being one of extensible messaging and presence protocol (XMPP), Jabber, wireless application protocol (WAP), Internet control message protocol (ICMP), Internet relay chat (IRC), Property Class, short messaging system (SMS), or simple message transfer protocol (SMTP).

21. A computer program product embodied in a non-transitory computer readable medium and comprising computer instructions for:

generating data associated with a first synthetic environment, the first synthetic environment comprising one or more communication protocols;

determining whether each of two or more endpoints is one of: logged into the first synthetic environment, logged into a second synthetic environment, and not logged into any synthetic environment, each of the two or more endpoints being associated with a different user, wherein the determining comprises:

polling an endpoint to determining whether the endpoint is logged into one of the first or the second synthetic environments or not logged into any synthetic environment; and in the event that the endpoint is logged into one of the first or the second synthetic environments:
querying the endpoint for an identifying number; and
comparing the identifying number to a list of identifying numbers corresponding to accounts logged into one of the first or the second synthetic environments to determine whether the endpoint is logged into the first synthetic environment or the second synthetic environment;

converting the data using a first of the one or more communication protocols to generate converted data based on a friends' list, a guild list, a preference, or a filter, wherein the converted data is interpreted using a second of the one or more communication protocols; and transmitting the data over a communication path between the two or more endpoints using one or more communication interfaces, wherein the data, after being interpreted by the second of the one or more communication protocols, is used to present information associated with the first synthetic environment on at least one of the two or more endpoints, the first of the one or more communication protocols being one of extensible messaging and presence protocol (XMPP), Jabber, wireless application protocol (WAP), Internet control message protocol (ICMP), Internet relay chat (IRC), Property Class, short messaging system (SMS), or simple message transfer protocol (SMTP).

22. The method of claim 1, wherein the transforming of the message and the data comprises:
determining an environment related to the endpoint; and
converting the message to a format related to the determined environment.

* * * * *